(12) United States Patent
Maisels et al.

(10) Patent No.: US 9,878,911 B2
(45) Date of Patent: Jan. 30, 2018

(54) CARBON AEROGELS, PROCESS FOR THEIR PREPARATION AND THEIR USE

(71) Applicant: Evonik Carbon Black GmbH, Hanau (DE)

(72) Inventors: Arkadi Maisels, Hanau (DE); Yves Gorat Stommel, Shanghai (CN); Frank Stenger, Alzenau (DE); Jutta Zimmermann, Alzenau (DE); Manfred Dannehl, Kahl (DE); Johann Mathias, Kahl (DE)

(73) Assignee: Evonik Carbon Black GmbH, Hanau (DE)

( * ) Notice: Subject to any disclaimer, the term of this patent is extended or adjusted under 35 U.S.C. 154(b) by 0 days.

(21) Appl. No.: 15/477,207

(22) Filed: Apr. 3, 2017

(65) Prior Publication Data
US 2017/0233252 A1    Aug. 17, 2017

Related U.S. Application Data

(62) Division of application No. 12/812,543, filed as application No. PCT/EP2009/050422 on Jan. 15, 2009, now abandoned.

(30) Foreign Application Priority Data

Jan. 17, 2008   (DE) .................... 10 2008 005 005
Oct. 14, 2008   (EP) ...................... 08166593

(51) Int. Cl.
     *B01J 13/00*      (2006.01)
     *C01B 31/02*      (2006.01)

(52) U.S. Cl.
     CPC ........... *C01B 31/02* (2013.01); *B01J 13/0091* (2013.01); *C01P 2004/62* (2013.01); *C01P 2006/14* (2013.01)

(58) Field of Classification Search
None
See application file for complete search history.

(56) References Cited

U.S. PATENT DOCUMENTS 3,660,133 A    5/1972   Van Der Schuyt et al.
3,903,034 A    9/1975   Zabiak et al.
(Continued)

FOREIGN PATENT DOCUMENTS

CA        2207414      6/1996
CN        1895770 A    1/2007
(Continued)

OTHER PUBLICATIONS

English language translation of the International Search Report for corresponding PCT/EP2009/050422 filed Jan. 15, 2009.
(Continued)

*Primary Examiner* — Guinever S Gregorio
(74) *Attorney, Agent, or Firm* — Law Office of Michael A. Sanzo, LLC

(57) ABSTRACT

The invention relates to carbon aerogels with particle sizes less than 1 μm. The carbon aerogels are prepared by (A)reacting a mono- and/or polyhydroxybenzene, an aldehyde and a catalyst in a reactor at a reaction temperature T in the range from 75-200° C. at a pressure of 80-2400 kPa, (B) then spraying the reaction mixture from process step (A) into an acid, (C) drying the resulting product from process step (B) and (D) carbonizing it. The carbon aerogels according to the invention can be used as filler, reinforcing filler, UV stabilizer, electrode material, sound absorbents, thermal insulating material, catalyst, catalyst support, conductivity additive, absorbent for gas and/or liquid preparation or pigment.

20 Claims, 4 Drawing Sheets

(56) References Cited

U.S. PATENT DOCUMENTS

| | | | |
|---|---|---|---|
| 4,997,804 A | 3/1991 | Pekala | |
| 5,430,088 A | 7/1995 | Ohashi et al. | |
| 5,508,341 A | 4/1996 | Mayer et al. | |
| 5,672,198 A | 9/1997 | Belmont | |
| 5,713,988 A | 2/1998 | Belmont et al. | |
| 5,772,975 A | 6/1998 | Mise et al. | |
| 5,900,029 A | 5/1999 | Belmont et al. | |
| 6,297,293 B1 | 10/2001 | Bell et al. | |
| 6,358,487 B1 | 3/2002 | Omae et al. | |
| 6,403,695 B1 | 6/2002 | Soeda et al. | |
| 6,582,505 B1 | 6/2003 | Bouvy et al. | |
| 6,685,769 B1 | 2/2004 | Karl et al. | |
| 6,737,445 B2 | 5/2004 | Bell et al. | |
| 6,753,108 B1 | 6/2004 | Hampden-Smith et al. | |
| 6,758,891 B2 | 7/2004 | Bergemann et al. | |
| 6,858,569 B2 | 2/2005 | Yokota et al. | |
| 6,960,250 B2 | 11/2005 | Leuthge et al. | |
| 7,198,668 B2 | 4/2007 | Reisacher et al. | |
| 8,236,274 B2 | 8/2012 | Quitmann et al. | |
| 2001/0036994 A1 | 11/2001 | Bergemann et al. | |
| 2002/0065333 A1 | 5/2002 | Bell et al. | |
| 2003/0101901 A1 | 6/2003 | Bergemann et al. | |
| 2004/0024074 A1 | 2/2004 | Tennison et al. | |
| 2004/0202603 A1 | 10/2004 | Fischer et al. | |
| 2004/0248731 A1 | 12/2004 | Vogel et al. | |
| 2005/0090609 A1 | 4/2005 | Reisacher et al. | |
| 2006/0230550 A1 | 10/2006 | Hees et al. | |
| 2006/0243165 A1 | 11/2006 | Lüthge et al. | |
| 2007/0031319 A1 | 2/2007 | Lüthge et al. | |
| 2007/0167534 A1 | 7/2007 | Coronado et al. | |
| 2008/0025907 A1 | 1/2008 | Tennison et al. | |
| 2008/0214730 A1 | 9/2008 | Henry et al. | |
| 2008/0219915 A1 | 9/2008 | Quitmann et al. | |
| 2008/0311398 A1 | 12/2008 | Bauer et al. | |
| 2009/0035210 A1 | 2/2009 | Krauss et al. | |
| 2009/0155157 A1 | 6/2009 | Stenger et al. | |
| 2009/0168305 A1 | 7/2009 | Fleig et al. | |
| 2009/0304570 A1* | 12/2009 | Kim | B01J 21/18 423/445 R |
| 2009/0305011 A1 | 12/2009 | McIntosh et al. | |
| 2010/0029795 A1* | 2/2010 | Tennison | C01B 31/00 521/82 |
| 2010/0147187 A1 | 6/2010 | Tauber et al. | |
| 2010/0180794 A1 | 7/2010 | Tauber et al. | |
| 2010/0248120 A1 | 9/2010 | Riebel et al. | |
| 2011/0034611 A1 | 2/2011 | Pelster et al. | |
| 2011/0207872 A1 | 8/2011 | Schinkel et al. | |
| 2011/0232531 A1 | 9/2011 | Gotz et al. | |
| 2011/0236816 A1 | 9/2011 | Stanyschofsky et al. | |
| 2012/0328881 A1 | 12/2012 | Quitmann et al. | |

FOREIGN PATENT DOCUMENTS

| | | |
|---|---|---|
| DE | 100 12 784 | 9/2001 |
| DE | 101 49 805 | 4/2003 |
| DE | 102 38 149 | 2/2004 |
| EP | 0 608 892 | 8/1994 |
| EP | 0 792 920 | 9/1997 |
| EP | 0 982 378 | 3/2000 |
| JP | 6-228371 | 8/1994 |
| JP | 6-279624 | 10/1994 |
| JP | 9-235485 | 9/1997 |
| JP | 10-140033 | 5/1998 |
| JP | 11-012487 | 1/1999 |
| JP | 11-092686 A | 4/1999 |
| JP | 11-189735 | 7/1999 |
| JP | 11-349309 | 12/1999 |
| JP | 2001-214068 | 8/2001 |
| JP | 2001-240768 | 9/2001 |
| JP | 2002-080758 | 3/2002 |
| JP | 2003-049101 | 2/2003 |
| JP | 2003-201418 A | 7/2003 |
| JP | 2004-067903 | 3/2004 |
| JP | 2004-224948 | 8/2004 |
| JP | 2006-022270 | 1/2006 |
| JP | 2006-052413 | 2/2006 |
| JP | 2006-126387 | 5/2006 |
| JP | 2006-324183 | 11/2006 |
| JP | 2007-254243 | 10/2007 |
| WO | WO 92/04415 | 3/1992 |
| WO | WO 96/18690 A2 | 6/1996 |
| WO | WO 97/32571 A1 | 9/1997 |
| WO | WO 01/19904 A1 | 3/2001 |
| WO | WO 02/12380 A2 | 2/2002 |
| WO | WO 2006/036702 A2 | 4/2006 |
| WO | WO 2006/118186 A1 | 11/2006 |

OTHER PUBLICATIONS

English language translation of the Written Opinion of the International Searching Authority for corresponding PCT/EP2009/050422 filed Jan. 15, 2009.

English language translation of the International Preliminary Report on Patentability for corresponding PCT/EP2009/050422 filed Jan. 15, 2009.

Barral, et al., "Low-density organic aerogels by double-catalysed synthesis," *Journal of Non-Crystalline Solids* 225:46-50 (1998).

Fung, et al., "Relationship between particle size and magnetoresistance in carbon aerogels prepared under different catalyst conditions," *Journal of Non-Crystalline Solids* 186:200-208 (1995).

Horikawa, et al., "Size control and characterization of spherical carbon aerogel particles from resorcinol-formaldehyde resin," *Carbon* 42:169-175 (2004).

Hwang, et al., "Capacitance Control of Carbon Aerogel Electrodes," *Journal of Non-Crystalline Solids* 347:238-245 (2004).

Lin, et al., "Carbonization and Activation of Sol-Gel Derived Carbon Xerogels," *Carbon* 38:849-861 (2000).

Wu, et al.,"Low-density organic and carbon aerogels from the sol-gel polymerization of phenol with formaldhyde," *Journal of Non-Crystalline Solids* 351:915-921 (2005).

Wu and Fu, "Synthesis of organic and carbon aerogels from phenol-furfural by two-step polymerization," *Microporous and Mesoporous Materials* 96:115-120 (2006).

First English language abstract for CN 1895770.
Second English language abstract for CN 1895770.
English language abstract for DE 100 12 784.
English language abstract for DE 101 49 805.
English language abstract for DE 102 38 149.
English language abstract for JP 6-228371.
Machine translation of JP 6-228371.
English language abstract for JP 6-279624.
English language abstract for JP 9-235485.
English language abstract for JP 10-140033.
English language abstract for JP 11-012487.
Machine translation of JP 11-012487.
English language abstract for JP 11-092686.
Machine translation of JP 11-092686.
English language abstract for JP 11-349309.
Machine translation of JP 11-349309.
English language abstract for JP 2001-214068.
Machine translation of JP 2001-214068.
English language abstract for JP 2001-240768.
Machine translation of JP 2001-240768.
English language abstract for JP 2002-080758.
Machine translation of JP 2002-080758.
English language abstract for JP 2003-049101.
Machine translation of JP 2003-049101.
English language abstract for JP 2003-201418.
English language abstract for JP 2004-067903.
Machine translation of JP 2004-067903.
English language abstract for JP 2004-224948.
Machine translation of JP 2004-224948.
English language abstract for JP 2006-022270.
Machine translation of JP 2006-022270.
English language abstract for JP 2006-052413.
Machine translation of JP 2006-052413.

(56) References Cited

OTHER PUBLICATIONS

English language abstract for JP 2006-126387.
Machine translation of JP 2006-126387.
English language abstract for JP 2006-324183.
English language abstract for JP 2007-254243.
English language abstract for WO 2006/118186.
English language abstract for JP 10-510861.
English language abstract for RU 2173327.
English language abstract for RU 2200562.
English language abstract for RU 2211230.
Brief on Appeal for U.S. Appl. No. 12/812,543, filed by Applicant on Feb. 18, 2015.
Corrected "Summary of Claimed Subject Matter" section for Brief on Appeal for U.S. Appl. No. 12/812,543, filed by Applicant on May 15, 2015.
Examiner's Answer in appeal for U.S. Appl. No. 12/812,543, mailed on Oct. 24, 2015.
Reply Brief in appeal for U.S. Appl. No. 12/812,543, filed by Applicant on Dec. 3, 2015.
Decision on Appeal for U.S. Appl. No. 12/812,543, mailed on Feb. 6, 2017.

\* cited by examiner

CARBON AEROGELS, PROCESS FOR THEIR PREPARATION AND THEIR USE

CROSS REFERENCE TO RELATED APPLICATIONS

The present application is a division of U.S. Ser. No. 12/812,543, which is US national stage of international application, PCT/EP2009/050422 which had a filing date of Jan. 15, 2009, and which was published in German under PCT Article 21(2) on Jul. 23, 2009. Priority is claimed to German application DE 102008005005.9, filed on Jan. 17, 2008 and to European application EP 08166593.7, filed on Oct. 14, 2008, which are hereby incorporated by reference in their entirety.

FIELD OF THE INVENTION

The invention relates to carbon aerogels, to a process for production thereof and to the use thereof.

BACKGROUND OF THE INVENTION

U.S. Pat. No. 4,997,804 discloses organic aerogels produced from resorcinol-formaldehyde, hydroquinone-resorcinol-formaldehyde, phloroglucinol-resorcinol-formaldehyde and catechol-resorcinol-formaldehyde. This process forms macroscopic shaped bodies whose volume is determined by the reactor geometry.

Moreover, U.S. Pat. No. 5,508,341 discloses a process for producing organic aerogels, wherein an aqueous organic phase is stirred in mineral oil until the organic phase polymerizes to a gel. The organic aerogels thus obtained have a particle size of 1 μm to 3 mm.

WO 02/12380 discloses porous resins which are carbonized to mesoporous carbon with a particle size of 2 μm to 2 mm.

WO 01/19904, U.S. Pat. Nos. 6,737,445 (B2), 6,297,293 (B1), US2002065333 (A1) disclose processes for producing monolithic polymer or carbon structures with defined mesoporosity.

Barral (Journal of Non-Crystalline Solids, Vol. 225, p. 46-50, 1998), Wu and Fu (Microporous and Mesoporous Materials, Vol. 96, p. 115-120, 2006) and Wu et al. (Journal of Non-Crystalline Solids 351 (2005) 915-921) disclose that monolithic polymer or carbon structures with defined porosity can be produced by a two-stage process (pH shift instead of constant pH).

DESCRIPTION OF THE INVENTION

A disadvantage of the known carbon aerogels is the poor dispersibility, for example in coating applications.

It is an object of the invention to provide a carbon aerogel which, owing to its fine division, has good dispersibility.

The invention provides a carbon aerogel, which is characterized in that the mean particle size is less than 1 μm, preferably between 0.05 and 1 μm, more preferably between 0.1 and 1 μm, most preferably between 0.5 and 0.95 μm.

The mean particle size is determined by means of laser diffraction to ISO 13320-1(1999). To evaluate the diffraction spectrum measured, the Mie theory with the assumption of spherical particles is employed. The laser diffraction analysis instrument used is a HORIBA LA-920.

To analyse particle sizes <1 μm, it is necessary to have information about the scattering in the sideways and backward direction. For this reason, the instrument used utilizes 13 different detectors, 12 for measurement in the sideways and backward direction, and also, through a Fourier lens, an array of 75 photodiodes for measurement in the forward direction.

The light sources used are a tungsten lamp (50 W) whose light is filtered to 405 nm, and an He—Ne laser (0.1 W) with a wavelength of 632.8 nm.

For the measurement, the carbon aerogel is first introduced at room temperature, with the aid of a magnetic stirrer, into distilled water which has been adjusted with 0.1 M NaOH to a pH of 9-10. The solids concentration is 1% by weight. The dispersion is effected in a water-cooled 30 ml snap-lid bottle by means of an ultrasound finger (from Bandelin, 70 W, pulsation 80) for 4.5 minutes. In a further step, the dispersed suspension is introduced dropwise into the dispersion liquid present in the wet cell in the analysis instrument (distilled water adjusted to pH 9-10 with 0.1 M NaOH) until laser shadowing between 5 and 10% is achieved. The pumped circulation of the suspension now present in the analysis instrument into the test cell is effected by means of the stirrer incorporated into the analysis instrument.

The diffraction spectrum is evaluated by means of the Mie theory and a relative refractive index of 1.5 and an absorption index of 0.3. The particle size distribution is shown as the numerical distribution $Q_0$ by conversion from the corresponding volume distribution. The mean particle size here refers, according to ISO 13320-1, to the $x_{50}$ of the $Q_0$ distribution.

The inventive carbon aerogel may have a mean fractal dimension of 1.0 to 2.7, preferably of 1.1 to 2.5, more preferably of 1.2 to 2.3.

The mean fractal dimension of the carbon aerogel is determined by means of image analysis of transmission electron micrographs according to Rogak et al. (Aerosol Science and Technology, Vol. 18, 1993, p. 25-47).

The inventive carbon aerogel may have a density of 0.005-2.0 g/cm$^3$, preferably 0.15-1.5 g/cm$^3$, more preferably 0.35-1.3 g/cm$^3$.

The density of the carbon aerogel is determined by the determination of the specific pore volume in $N_2$ adsorption measurements. When the specific pore volume $v_p$ is known from the $N_2$ adsorption measurement, the following expression is obtained for the density $\rho_{c-A}$ of the carbon aerogel: $\rho_{c-A}=1/(1/\rho_c+v_p)$. For the density of the carbon $\rho_c$ and for the specific pore volume $v_p$, numerical values corresponding to dimensions g/cm$^3$ and cm$^3$/g respectively are used.

The inventive carbon aerogel may be a foam.

The pH of the inventive carbon aerogel may be <7.0, preferably <6.0, more preferably <5.0.

To determine the pH, 1 g of the carbon aerogel is admixed with 20 ml of deionized, $CO_2$-free water in an Erlenmeyer flask and stirred on a magnetic stirrer for 1 min. Subsequently, the glass electrode (Hamilton Polilyte Pro 120) of the pH analysis instrument (Titroprocessor 686, from Metrohm) is immersed approx. 10 mm into the suspension, ensuring that the electrode touches neither the sediment formed nor the vessel wall. As soon as a constant value has been established, the pH is read off.

The inventive carbon aerogel may have an STSA value of 20-1300 m$^2$/g, preferably of 30-1000 m$^2$/g, more preferably of 50-800 m$^2$/g.

The STSA measurement is effected according to DIN ISO 9277 (1995).

The inventive carbon aerogel may have a BET value of 20-1500 m$^2$/g, preferably of 100-1200 m$^2$/g, more preferably of 400-900 m$^2$/g.

The BET surface area is determined to DIN ISO 9277 (1995) in a NOVA e2000 sorption analysis instrument from QUANTACHROME. The sorption gas used is nitrogen. Before the determination, the samples are baked at a temperature of 350° C. and a pressure of <13.3 Pa for more than 12 hours. The sorption isotherms are evaluated to determine the BET surface area in the relative pressure range $p/p_0$ of 0.01 to 0.1.

The inventive carbon aerogel may have a mesopore volume of 0.005-5 $cm^3/g$, preferably of 0.05-3 $cm^3/g$, more preferably of 0.2-2 $cm^3/g$.

The inventive carbon aerogel may have a mean mesopore diameter of 1.8-50 nm, preferably of 5-45 nm, more preferably of 10-35 nm.

The mesopore volume and the pore radius distribution are determined to DIN 66134 (1998) by the BJH method from the desorption data of the isotherms recorded in the relative pressure range $p/p_0$ of 0.99 to 0.34.

In addition, the inventive carbon aerogel may have a micropore volume of 0.01-1.0 $cm^3/g$, preferably of 0.05-0.5 $cm^3/g$, more preferably of 0.1-0.35 $cm^3/g$.

The micropore volume is determined to DIN 66135-1, 66135-2, 66135-3 (2001) by the t-plot process. The t-plot is evaluated by the de Boer equation.

The inventive carbon aerogel may have a content of volatile constituents of <15.0% by weight, preferably of <5.0% by weight, more preferably of <1.5% by weight, most preferably of <0.5% by weight.

The volatile constituents >950° C. are determined on the basis of DIN 53552 (1977). To this end, the sample is first dried to constant weight in a drying cabinet at 105° C. and cooled in a desiccator. Subsequently, the sample, in a departure from DIN 53552, is filled into a quartz crucible (13 ml) and covered with a lid which has a hole of approx. 2 mm in the centre. In a muffle furnace, it is finally heated to 950° C. for 7 min. The cooling is again effected in a desiccator. The volatile fractions are calculated from the weight loss.

The inventive carbon aerogel may have a My value of 200-400, preferably of 250-390, more preferably of 260-380.

The My value is determined by drying the carbon aerogel to constant weight at 105° C. and then cooling it in a desiccator.

1.3 g of the dried carbon aerogel are weighed into a cup with a screw lid (PTFE, volume 240 ml). 27.3 g of component A, consisting of 77% by weight of Alkydal F3100 (60%) (from Bayer) and 23% by weight of diluent (composed of 68.2% by weight of xylene, 13.6% by weight of ethoxypropanol, 9.1% by weight of butanol, 4.6% by weight of butylglycol and 4.5% by weight of Baysilon (10% by weight of Baysilon OL 17 (from Bayer) and 90% by weight of xylene)), and 12.7 g of component B (77% by weight of Maprenal MF 800 (55%) (from Ineos) and 23% by weight of diluent (composition as in component A)) are additionally weighed in. 275 g of steel beads (Chromanite, ø=3 mm) are added and the lid is screwed on.

The mixture is shaken for 30 min in an air-cooled shaking mixer (Skandex BAS 20K mixer (from Lau)). The mixture thus produced is referred to as black paste.

A 90 μm-thick layer of the black paste is applied with the aid of a doctor blade to a clean, degreased glass plate (cut microscope slide, AA09013002EAOMNZ, from Gerhard Menzel Glasbearbeitungswerk GmbH & Co KG) with a degreased surface and, after venting, baked in a force-air oven at 130° C. over 30 min.

After cooling, the colour is analysed to DIN 55 979 (1989) through glass.

The inventive carbon aerogel may have a Gy value of 50-130, preferably of 60-130, more preferably of 70-130.

The Gy value is determined by weighing 60 g of steel beads (chromanite, ø=3 mm), 62.9 g of white paste (GX white pigment paste from BASF), 2.3 g of hardener (Luwipal 012 (from BASF)) and 16.0 g of the black paste from the My determination together into a cup with a screw lid (PTFE, volume 240 ml) and mixing partially.

The cup is closed and the mixture is shaken in an air-cooled shaking mixer (Skandex mixer BAS 20K (from Lau)) for 30 min.

The colour paste is processed further within 10 min in order to prevent sedimentation. To this end, a 90 μm-thick coating layer is applied with a doctor blade to a clean, degreased glass plate (cut microscope slide, AA09013002EAOMNZ, from Gerhard Menzel Glasbearbeitungswerk GmbH & Co KG) and, after venting, baked in a force-air oven at 130° C. within 30 min.

After cooling, the colour measurement to DIN 55 979 is effected through glass.

The inventive carbon aerogel may have a carbon content of 85-100% by weight, preferably of 95-100% by weight, more preferably of 98-100% by weight, most preferably of 99-100% by weight.

The inventive carbon aerogel may have an electric surface resistivity of 1 kOhm to 1 TOhm.

The electrical surface resistivity is measured on the coating slabs for the My determination. Before the measurement, the coating slabs are stored at 23° C. and 54% relative air humidity for 24 hours. The measurement is effected at 23° C. and 23% relative air humidity with an M 1500 P megaohmmeter (from Sefelec). The measurement is effected at a voltage of 500 V by means of two electrodes of application area in each case 5×30 mm laden with 275 g of applied weight for 60 s. Between the two electrodes, there is thus an area of 30×30 mm.

The inventive carbon aerogel (first inorganic phase) may comprise a second inorganic phase. The second inorganic phase may be distributed within the carbon aerogel and/or on the surface. The proportion of the second inorganic phase in the carbon aerogel based on the total weight may vary from 0.001-0.8 part by weight, preferably from 0.01-0.5 part by weight, more preferably from 0.03-0.4 part by weight.

The second inorganic phase may be nanostructured.

The second inorganic phase may comprise metal elements and/or ions, for example silicon, gold, silver, platinum, palladium, ruthenium, rhodium, iridium, nickel, cobalt, iron, copper, zinc and mixtures of the aforementioned substances, and/or nonmetal elements, for example carbon black, carbon aerogels, carbon nanotubes, carbon nanorods, graphite and graphitic structures, and mixtures of the aforementioned substances.

The invention further provides a process for producing the inventive carbon aerogels, which is characterized in that:

(A) a mono- and/or polyhydroxybenzene, an aldehyde and a catalyst are reacted in a reactor at a reaction temperature T in the range of 75-200° C., preferably in the range of 80-150° C., more preferably in the range of 95-135° C., at a pressure of 80-2400 kPa, preferably of 100-700 kPa, more preferably of 125-500 kPa, (B) then the reaction mixture from process step (A) is sprayed into an acid, (C) the resulting product from process step (B) is dried and (D) carbonized.

The polyhydroxybenzene used in process step (A) may be a di- or trihydroxybenzene, for example catechol, resorcinol, phloroglucinol, hydroquinone and mixtures thereof. Preferably, a monohydroxybenzene (phenol) may be used.

The aldehyde used in process step (A) may be formaldehyde, glyoxal, glutaraldehyde, furfural and mixtures thereof. The aldehyde used in process step (A) may preferably be formaldehyde. The aldehydes used may also be present as an aqueous solution or in a solvent.

In addition, it is possible to use precondensates based on mono- and/or polyhydroxybenzene and aldehyde, for example resols and novolac.

The solvents used may be water, alcohols, ketones and mixtures of the aforementioned substances.

Process step (A) can be performed without the addition of a pore former.

Process step (A) can be performed with addition of a pore former.

The pore formers used may, for example, be ethylene glycol, polyethylene glycol, butylene glycol, diethylene glycol, triethylene glycol, gamma-butyrolactone, propylene carbonate, dimethylformamide, monoethanolamine or N-methyl-2-pyrrolidinone, and mixtures of the aforementioned substances.

The catalyst used may be a base, for example an alkali metal hydroxide or alkaline earth metal hydroxide, with a sufficient solubility in the solvent. For this purpose, it is possible to use NaOH, KOH, $Na_2CO_3$, $Li_2CO_3$, $K_2CO_3$, $NH_3$ or any other base. Preferably, NaOH may be used.

The concentration of mono- and/or polyhydroxybenzene and aldehyde in the reaction mixture may be 10-60% by weight, preferably 20-40% by weight, more preferably 20-30% by weight.

The molar ratio of mono- and/or polyhydroxybenzene to aldehyde may be 1:1 to 1:4, preferably 1:2 to 1:3, in the reaction mixture of process step (A).

The molar ratio of the mono- and/or polyhydroxybenzene used to NaOH may be 0.1 to 100, preferably 0.5 to 50, more preferably 0.7 to 20, in the reaction mixture of process step (A).

The aldehyde which is used with preference in process step (A) may be a solution of formaldehyde, water and stabilizers, for example methanol.

The pH of the reaction mixture in process step (A) may vary from 8.5 to 12, preferably from 9.0 to 9.7.

The starting compounds can be mixed in process step (A) in a separate vessel, possibly at a temperature different from the reaction temperature T specified.

The pressure existing in process step (A) can be applied from the outside, or generated by increasing the temperature in a closed system or by a combination of the two.

On attainment of the reaction temperature T, the reaction time in process step (A) may be between 0.001 and 1000000 s, preferably between 1 and 36000 s, more preferably between 60 and 3600 s.

The reaction in process step (A) can be effected with stirring.

The time at which the reaction mixture from process step (A) is sprayed into the acid in process step (B) can be determined with light transmission measurements. The light transmission value at the time of spraying may, at a wavelength of 475 nm, be less than 80%, preferably between 0.01% and 50%, more preferably between 0.1% and 40%, of the starting transmission.

The light transmission can be measured in situ with the E 616 photometer (from Metrohm).

The acid used in process step (B) may be present either as a solution or as a gas.

The acid used in process step (B) may be used either in concentrated or dilute form.

The acid used in process step (B) may be an inorganic acid, for example mineral acid, or organic acid. The mineral acid may be hydrochloric acid, nitric acid, phosphoric acid or sulphuric acid. The organic acid may be acetic acid, formic acid or oxalic acid.

The acid used may have a pH of less than 2.0, preferably 0.5-1.5, more preferably 0.5-1.0.

The amount of acid solution used may be at least the amount, preferably at least five times the amount, of the liquid mixture from process step (A) introduced.

The acid solution from process step (B) may have a temperature of 0-200° C., preferably 10-90° C., more preferably of 15-50° C.

The gaseous acid from process step (B) may have a temperature of 10-300° C., preferably 50-200° C., more preferably of 70-180° C.

The reaction mixture from process step (A) can be sprayed into the acid by means of nozzles.

The nozzle orifices may be 0.01 to 3 mm, preferably 0.05 to 2 mm, more preferably 0.1 to 1.5 mm.

The nozzles used may be one-substance or multisubstance nozzles.

The atomizer media used may be gaseous substances, for example such as air, nitrogen, $CO_2$, argon and/or vaporous or gaseous acids such as HCl.

The nozzles used may be full-cone, hollow-cone, flat-jet and smooth-jet nozzles.

The reaction mixture from process step (A) can be sprayed into the acid through external fields.

The external fields may be electrical or acoustic fields, for example ultrasound.

The reaction mixture from process step (A) can be sprayed into the acid via rotary atomizers, vibratory atomizers or Venturi nozzles.

The droplet size generated by the spraying in process step (B) may be 50 nm to 3 mm, preferably 100 nm to 1 mm, more preferably 200 nm to 0.5 mm.

The residence time in the acid from process step (B) may be between 0.01 and 100000 s, preferably between 1 and 10000 s, more preferably between 10 and 5000 s.

The resulting product of process step (B) can be thickened and subsequently dried.

The resulting product from process step (B) can be thickened by means of centrifugation, sedimentation, filtration, or thermally.

The drying in process step (C) can be effected convectively, supercritically, by means of freeze-drying, infrared radiation, microwave drying, or as a combination of the aforementioned drying processes.

In the case of use of gaseous acid in process step (B), process step (C) can be carried out within process step (B).

The drying temperature in the convective drying may be 10-300° C., preferably 50-200° C. The drying temperature in the freeze-drying may be −50-0° C., preferably −20-0° C.

The convective drying may be carried out as spray-drying.

For the spray-drying, the resulting product from process step (B) may optionally also be used without thickening. The spray-drying can be carried out at a temperature of 80-300° C., preferably of 80-250° C.

The residual moisture content of the product from process step (C) based on the proportion by mass of the solvent in the reaction mixture from process step (A) may be 0-90% by weight, preferably 10-80% by weight, more preferably 65-75% by weight. The proportion by mass of the solvent is determined gravimetrically.

The product obtained from process step (C) may be comminuted before further processing. A further drying step may follow.

The carbonization of process step (D) can be carried out at a temperature of 500-1400° C., preferably 600-900° C., more preferably 650-800° C. The carbonization can be effected with exclusion of oxygen, for example under protective gas, preferably nitrogen or argon, or under reduced pressure. The carbonization can be effected by means of infrared, microwave, plasma, electrical or thermal heating.

The process according to the invention can be carried out continuously or batchwise.

The carbon aerogel obtained from process step (D) can be aftertreated, for example oxidized and/or activated, in a subsequent step.

The aftertreatment can be effected physically and/or chemically.

The carbon aerogel which has been obtained from process step (D) and optionally aftertreated can be granulated for better handling.

The granulated carbon aerogel can be wet-, dry-, oil- and/or wax-granulated.

The granulation liquids used may be water, silanes or hydrocarbons, for example petroleum or cyclohexane, with or without addition of binders, for example molasses, sugars, lignosulphonates and numerous other substances, alone or in combination with one another.

The inventive carbon aerogels can be used, inter alia, as a filler, reinforcing filler, UV stabilizer, electrode material, sound absorber, thermal insulation material, catalyst, catalyst support, conductivity additive, absorber for gas and/or liquid formulations or pigment.

The inventive carbon aerogels can be used, inter alia, in rubber, plastic, plastics dispersions, adhesives, printing inks including inkjet inks, other inks, toners, coatings, batteries, fuel cells, ceramic, dyes, paper, bitumen, concrete and other building materials. The inventive carbon aerogels can also be used as reducing agents in metallurgy.

The invention further provides a coating which is characterized in that it comprises the inventive carbon aerogel.

The inventive carbon aerogel may be present in the coating at 0.1 to 30% by weight, preferably 0.5 to 10% by weight.

The invention further provides a plastics mixture which is characterized in that it comprises the inventive carbon aerogel.

The inventive carbon aerogel may be present in the plastics mixture at 0.1 to 30% by weight, preferably 0.5 to 10% by weight.

The invention further provides a printing ink which is characterized in that it comprises the inventive carbon aerogel.

The inventive carbon aerogel may be present in the printing ink at 0.1 to 50% by weight, preferably 0.5 to 40% by weight.

The invention further provides an ink which is characterized in that it comprises the inventive carbon aerogel.

The inventive carbon aerogel may be present in the ink at 0.1 to 50% by weight, preferably 0.5 to 40% by weight.

The invention further provides a rubber mixture which is characterized in that it comprises the inventive carbon aerogel.

The inventive carbon aerogel may be present in the rubber mixture at 0.1-200 parts by weight, preferably 5-150 parts by weight, based on the rubber in the rubber mixture.

The inventive carbon aerogels have the advantage that, owing to the fineness, the dispersibility is improved over the carbon aerogels known from the prior art.

The process according to the invention has the advantage that a fine product is obtained directly in the process according to the invention.

BRIEF DESCRIPTION OF THE DRAWINGS

FIG. 1 shows the mesopore distribution of the carbon aerogel produced as described in Example 4.
FIG. 2 shows the mesopore distribution of the carbon aerogel produced as described in Example 5.
FIG. 3 shows the mesopore distribution of the carbon aerogel produced as described in Example 6.
FIG. 4 shows the mesopore distribution of the carbon aerogel produced as described in Example 7.

EXAMPLES

Example 1 (Comparative Example, Barral, Journal of Non-Crystalline Solids, Vol. 225, p. 47 (Double Step Process), 1998)

0.68 g of phloroglucinol is dissolved in 101.6 g of water at room temperature. 0.32 g of 37% formaldehyde solution is added to the solution. Subsequently, 0.02 g of calcium hydroxide is added. A closed glass vessel containing the solution is heated without stirring in a silicone oil bath at 90° C. After a 5-minute residence time in the silicone oil bath, the still liquid solution is cooled to room temperature. Subsequently, 0.128 g of 37% HCl solution is added. The resulting solution is kept at a temperature of 92° C. for 72 h. The resulting organic gel is dried at room temperature and then carbonized in a muffle furnace at 800° C. under nitrogen for 1.5 hours. The resulting carbon system has a particle size distribution with $x_{50}$=1.07 μm (mean particle size) and $x_{95}$=3.09 μm. The carbon aerogel has a specific surface area of 233.5 m$^2$/g and a mesopore volume of 0.008 cm$^3$/g.

Example 2 (Comparative Example, WO 02/12380 A2, Examples 1-2)

Examples 1-2 mentioned in the patent WO 02/12380 A2 are reworked according to the description.

The resulting carbon system has a particle size distribution which cannot be characterized fully by means of the analysis method specified ($x_{95}$>3.0 mm). The carbon aerogel has a specific surface area of 535.2 m$^2$/g and a mesopore volume of 0.459 cm$^3$/g. The $M_y$ value of this carbon aerogel is 226.9.

Example 3

4.5 g of phenol are dissolved in 19.5 g of water at room temperature. 11.77 g of 37% formaldehyde solution are added to the solution. Subsequently, the solution is adjusted to the pH of 9.1 with 0.73 g of 25% sodium hydroxide solution. A closed glass vessel containing the solution is heated without stirring in a silicone oil bath at 90° C. After an eight-hour residence time in the silicone oil bath, the still liquid solution is sprayed by means of a Schlick model 121 V, type 8 hollow-cone nozzle (bore 0.8 mm) at a pressure of 2.5 bar into ten times the volume of the HCl solution at pH=1.0. After 20 hours of residence time at room temperature, the acid solution containing the organic fine particulate sediment is dried at 160° C. in a spray dryer. The dry gel is carbonized in a muffle furnace at 800° C. under nitrogen for 1.5 hours. The resulting fine particulate carbon system has a particle size distribution with $x_{50}$=316 nm (mean particle size) and $x_{95}$<512 nm. The carbon aerogel has a specific surface area of 613.3 m$^2$/g and a mesopore volume of 0.044 cm$^3$/g. The $M_y$ value of this carbon aerogel is 239.0. The $M_y$ value is higher than in example 2 (comparative example) and thus indicates better dispersibility.

Example 4

Figure 1:
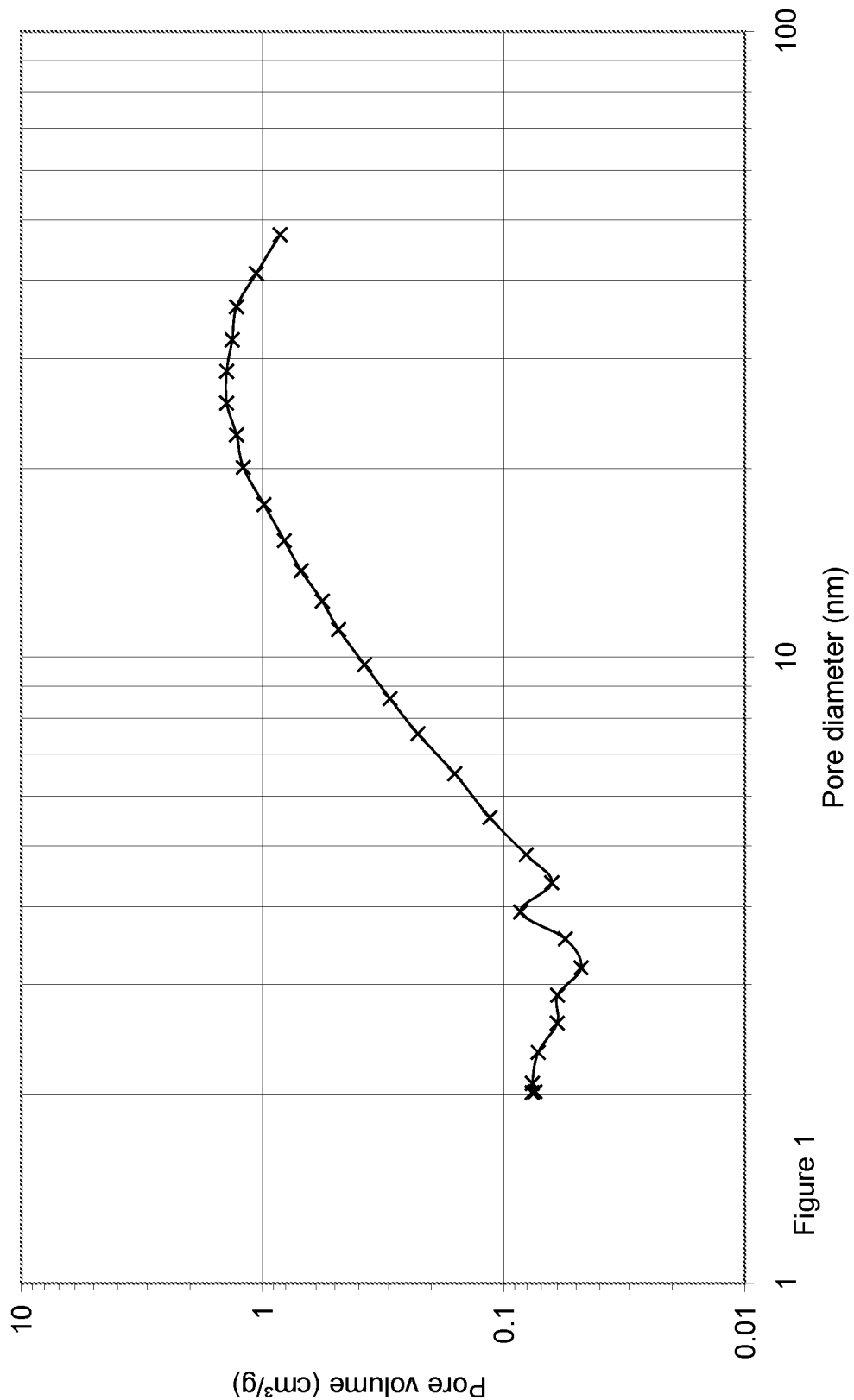
FIG. 1.

1.9 g of phenol (P) are dissolved in 11.52 g of water at room temperature. 4.97 g of 37% formaldehyde (F) solution are added to the solution. Subsequently, the solution is adjusted to the pH of 9.1 with 0.31 g of 25% sodium hydroxide solution. A closed vessel containing the solution is heated without stirring in a silicone oil bath at 85° C. After a ten-hour residence time in the silicone oil bath, the still liquid solution is sprayed by means of a Schlick model 121 V, type 8 hollow-cone nozzle (bore 0.8 mm) at a pressure of 2.5 bar into ten times the volume of the oxalic acid solution with pH=0.95 at a temperature of 85° C. The acid solution containing the organic fine particulate sediment formed is stored in a likewise closed vessel at 85° C. After 90 hours, the acid solution containing the fine particulate sediment is dried in a spray dryer at 160° C. The dried gel is carbonized in a muffle furnace at 800° C. under nitrogen for 1.5 hours. The resulting fine particulate carbon system has a particle size distribution with $x_{50}$=495 nm (mean particle size) and $x_{95}$=917 nm. The carbon aerogel has a specific surface area of 734.8 m$^2$/g and a mesopore volume of 1.07 cm$^3$/g. The mesopore distribution is shown in FIG. 1. The $M_y$ value of this carbon aerogel is 285.7. The $M_y$ value is higher than in example 2 (comparative example) and thus indicates better dispersibility.

Example 5

Figure 2:
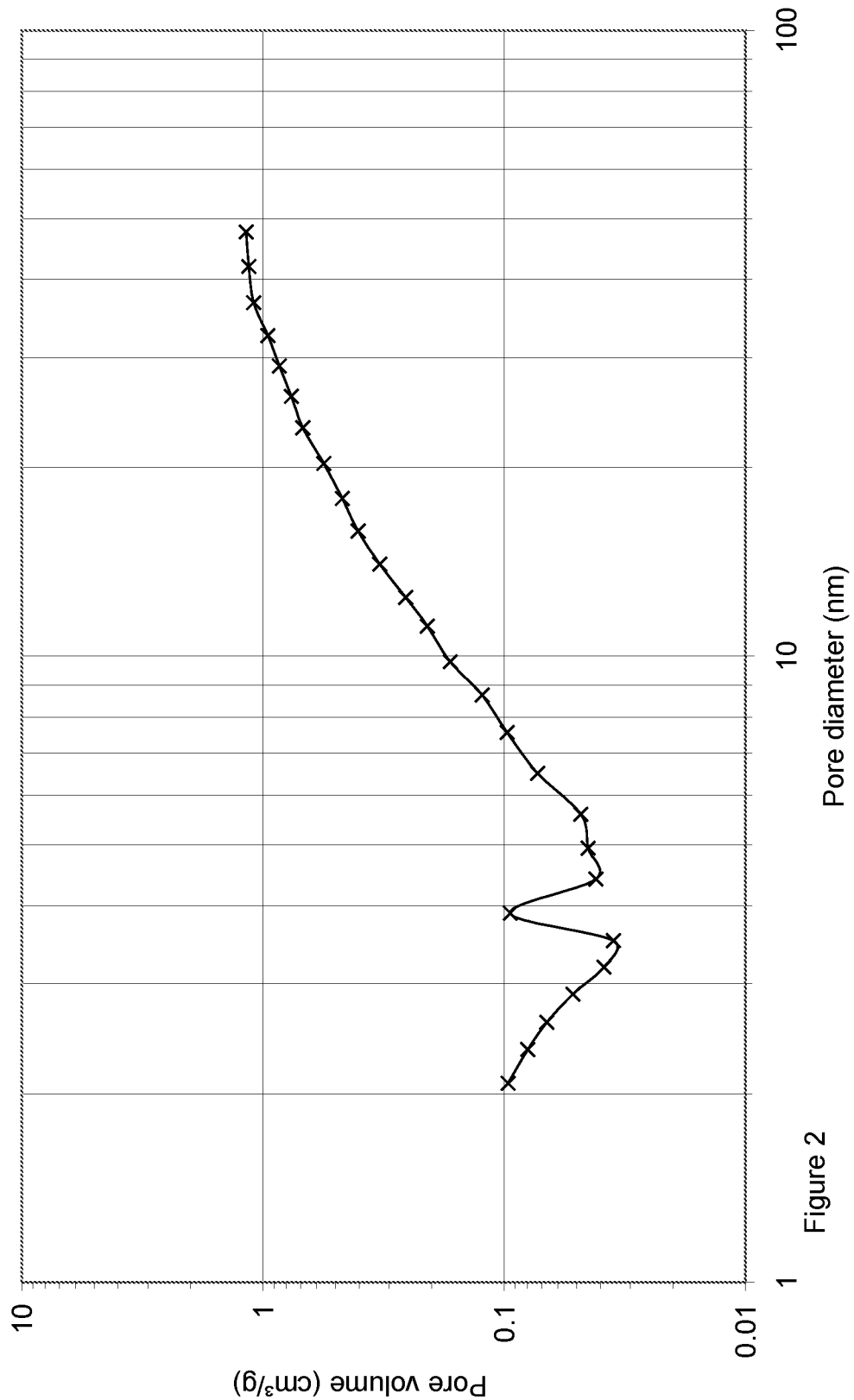
FIG. 2.

1.9 g of phenol are dissolved in 11.52 g of water at room temperature. 4.97 g of 37% formaldehyde solution are added to the solution. Subsequently, the solution is adjusted to the pH of 9.1 with 0.31 g of 25% sodium hydroxide solution. A closed vessel containing the solution is heated without stirring in a silicone oil bath at 85° C. After a ten-hour residence time in the silicone oil bath, the still liquid solution is sprayed by means of a Schlick model 121 V, type 8 hollow-cone nozzle (bore 0.8 mm) at a pressure of 2.5 bar into ten times the volume of the oxalic acid solution with pH=0.95 at a temperature of 85° C. The acid solution containing the organic fine particulate sediment formed is stored in a likewise closed vessel at 85° C. After 90 hours, the acid solution containing the fine particulate sediment is dried in a spray dryer at 160° C. The dried gel is carbonized in a muffle furnace at 800° C. under nitrogen for 1.5 hours. The resulting fine particulate carbon system has a particle size distribution with $x_{50}$=770 nm (mean particle size) and $x_{95}$=1916 nm. The carbon aerogel has a specific surface area of 699.9 m$^2$/g and a mesopore volume of 0.85 cm$^3$/g. The mesopore distribution is shown in FIG. 2. The $M_y$ value of this carbon aerogel is 272.7. The $M_y$ value is higher than in example 2 (comparative example) and thus indicates better dispersibility.

Example 6

Figure 3:
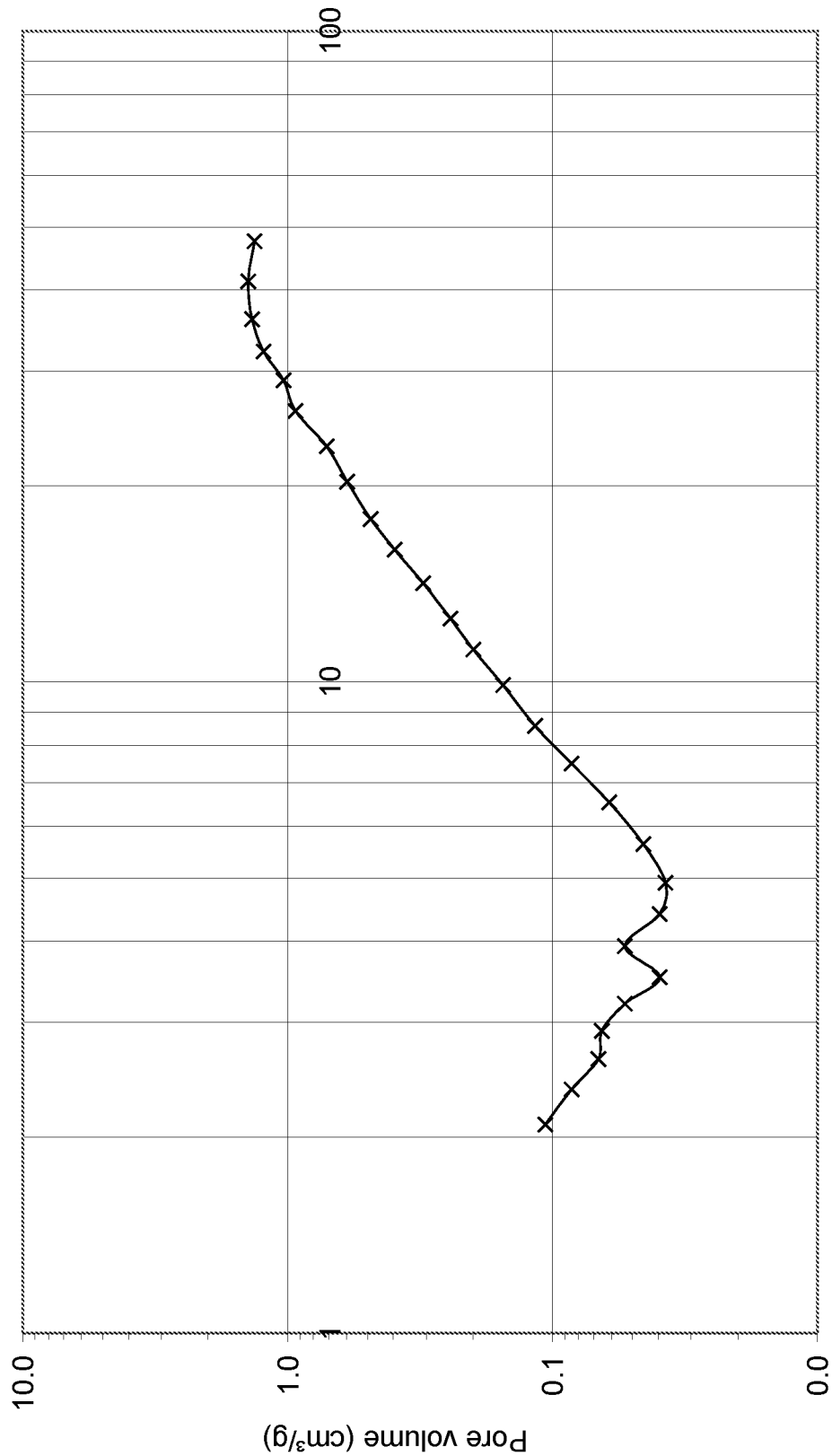
FIG. 3.

1.9 g of phenol are dissolved in 11.52 g of water at room temperature. 4.97 g of 37% formaldehyde solution are added to the solution. Subsequently, the solution is adjusted to the pH of 9.1 with 0.31 g of 25% sodium hydroxide solution. A closed vessel containing the solution is heated without stirring in a silicone oil bath at 125° C. The interior of the vessel is pressurized with a pressure of 4.5 bar (absolute). After an 18-minute residence time in the silicone oil bath, the still liquid solution is sprayed by means of a Schlick model 121 V, type 8 hollow-cone nozzle (bore 0.8 mm) at a pressure of 2.5 bar into ten times the volume of HCl with pH=0.95 at a temperature of 25° C. The acid solution containing the organic fine particulate sediment formed is stored in a likewise closed vessel at 25° C. After 24 hours, the acid solution containing the fine particulate sediment is dried in a spray dryer at 200° C. The dried gel is carbonized in a muffle furnace at 800° C. under nitrogen for 1.5 hours. The resulting fine particulate carbon system has a particle size distribution with $x_{50}$=810 nm (mean particle size) and $x_{95}$=1956 nm. The carbon aerogel has a specific surface area of 700.0 m$^2$/g and a mesopore volume of 1.03 cm$^3$/g. The mesopore distribution is shown in FIG. 3. The $M_y$ value of this carbon aerogel is 276.3. The $M_y$ value is higher than in example 2 (comparative example) and thus indicates better dispersibility.

Example 7

Figure 4:
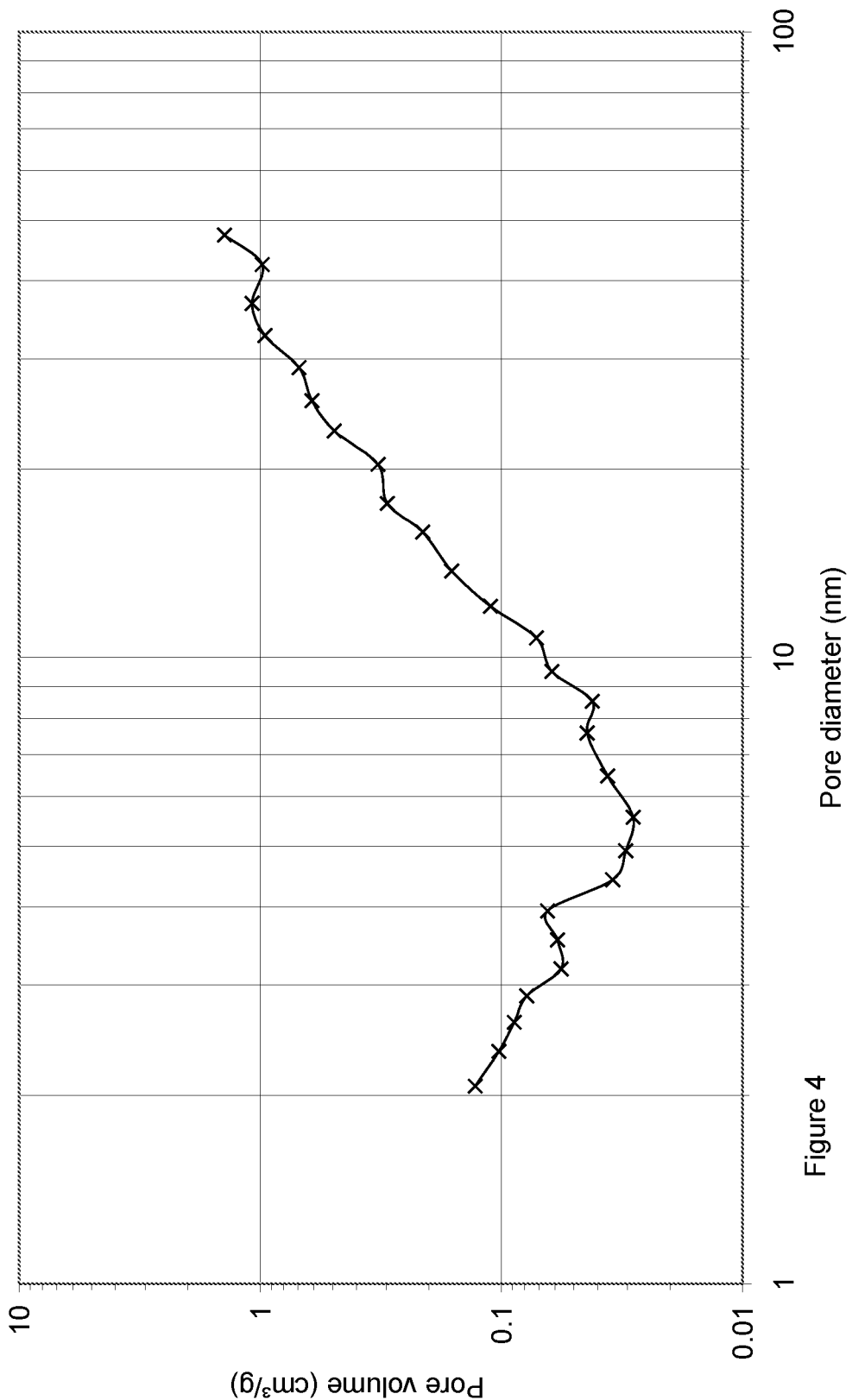
FIG. 4.

3.8 g of phenol are dissolved in 23.00 g of water at room temperature. 9.84 g of 37% formaldehyde solution are added to the solution. Subsequently, the solution is adjusted to the pH of 9.1 with 0.62 g of 25% sodium hydroxide solution. A closed vessel containing the solution is heated without stirring in a silicone oil bath at 125° C. The interior of the vessel is pressurized with a pressure of 4.5 bar (absolute). After a 19-minute residence time in the silicone oil bath, the still liquid solution is sprayed by means of a Schlick model 121 V, type 8 hollow-cone nozzle (bore 0.8 mm) at a pressure of 2.5 bar into ten times the volume of HCl with pH=1.01 at a temperature of 25° C. The acid solution containing the organic fine particulate sediment formed is stored in a likewise closed vessel at 25° C. After 24 hours, the acid solution containing the fine particulate sediment is dried in a spray dryer at 220° C. The dried gel is carbonized in a muffle furnace at 800° C. under nitrogen for 1.5 hours. The resulting fine particulate carbon system has a particle size distribution with $x_{50}$=830 nm (mean particle size) and $x_{95}$=1990 nm. The carbon aerogel has a specific surface area of 689.9 m$^2$/g and a mesopore volume of 0.91 cm$^3$/g. The mesopore distribution is shown in FIG. 4. The $M_y$ value of this carbon aerogel is 274.2. The $M_y$ value is higher than in example 2 (comparative example) and thus indicates better dispersibility

What is claimed:

1. A process for producing carbon aerogel particles having a mean particle size of less than 1 μm, said method comprising:
   a) reacting a mono- and/or polyhydroxybenzene and an aldehyde in the presence of a catalyst, wherein the reaction is carried out at a temperature in the range of 75-200° C. and at a pressure of 80-2400 kPa;
   b) spraying the reaction mixture produced in step a) into an acid wherein said spraying results in the subsequent formation of an organic fine particulate sediment;
   c) drying the product produced in step (b); and d) carbonizing the dried product produced in step c) to obtain the aerogel particles.

2. The process of claim 1, wherein said mono- and/or polyhydroxybenzene is selected from the group consisting of: phenol, catechol, resorcinol, phloroglucinol, hydroquinone and mixtures thereof.

3. The process of claim 2, wherein said aldehyde is selected from the group consisting of: formaldehyde, glyoxal, glutaraldehyde, furfural and mixtures thereof.

4. The process of claim 1, wherein said catalyst is an alkali metal hydroxide or alkaline earth metal hydroxide.

5. The process of claim 1, wherein said catalyst is selected from the group consisting of : NaOH, KOH, $Na_2CO_3$, $Li_2CO_3$, $K_2CO_3$, and $NH_3$.

6. The process of claim 5, wherein the concentration of mono- and/or polyhydroxybenzene and aldehyde in the reaction mixture is 10- 60% by weight, and
 a) said mono- and/or polyhydroxybenzene is selected from the group consisting of: phenol, catechol, resorcinol, phloroglucinol, hydroquinone and mixtures thereof; and
 b) said aldehyde is selected from the group consisting of: formaldehyde, glyoxal, glutaraldehyde, furfural and mixtures thereof.

7. The process of claim 6, wherein the concentration of mono- and/or polyhydroxybenzene and aldehyde in the reaction mixture is 20-40% by weight.

8. The process of claim 6, wherein the molar ratio of mono- and/or polyhydroxybenzene to aldehyde is 1:1 to 1:4.

9. The process of claim 6, wherein said acid is selected from the group consisting of hydrochloric acid, nitric acid, phosphoric acid, sulphuric acid, acetic acid, formic acid and oxalic acid.

10. The process of claim 9, wherein the reaction of step a) is performed in the presence of a pore former selected from the group consisting of: ethylene glycol, polyethylene glycol, butylene glycol, diethylene glycol, triethylene glycol, gamma-butyrolactone, propylene carbonate, dimethylformamide, monoethanolamine, N-methyl-2-pyrrolidinone, and mixtures of thereof.

11. The process of claim 1, wherein said carbon aerogel comprises a mean particle size of between 0.05 and 1 µm as determined by means of laser diffraction according to ISO 13320-1 and comprises a carbon content of 95-100% by weight.

12. The process of claim 11, wherein the concentration of mono- and/or polyhydroxybenzene and aldehyde in the reaction mixture is 10-60% by weight.

13. The process of claim 12, wherein said mono- and/or polyhydroxybenzene is selected from the group consisting of: phenol, catechol, resorcinol, phloroglucinol, hydroquinone and mixtures thereof.

14. The process of claim 13, wherein said aldehyde is selected from the group consisting of: formaldehyde, glyoxal, glutaraldehyde, furfural and mixtures thereof.

15. The process of claim 14, wherein said catalyst is an alkali metal hydroxide or alkaline earth metal hydroxide.

16. The process of claim 15, wherein said catalyst is selected from the group consisting of : NaOH, KOH, $Na_2CO_3$, $Li_2CO_3$, $K_2CO_3$, and $NH_3$.

17. The process of claim 16, wherein the concentration of mono- and/or polyhydroxybenzene and aldehyde in the reaction mixture is 20-40% by weight and the molar ratio of mono- and/or polyhydroxybenzene to aldehyde is 1:1 to 1:4.

18. The process of claim 1, wherein said carbon aerogel comprises a mean particle size of between 0.5 and 0.95 µm as determined by means of laser diffraction according to ISO 13320-1 and has a carbon content of 99-100% by weight.

19. The process of claim 1, wherein droplet size generated by the spraying in process step (B) is 200 nm to 0.5 mm.

20. The process of claim 1, wherein the time at which the reaction mixture from process step (A) is sprayed into the acid in process step (B) is determined with light transmission measurements.

\* \* \* \* \*